Figure 1:
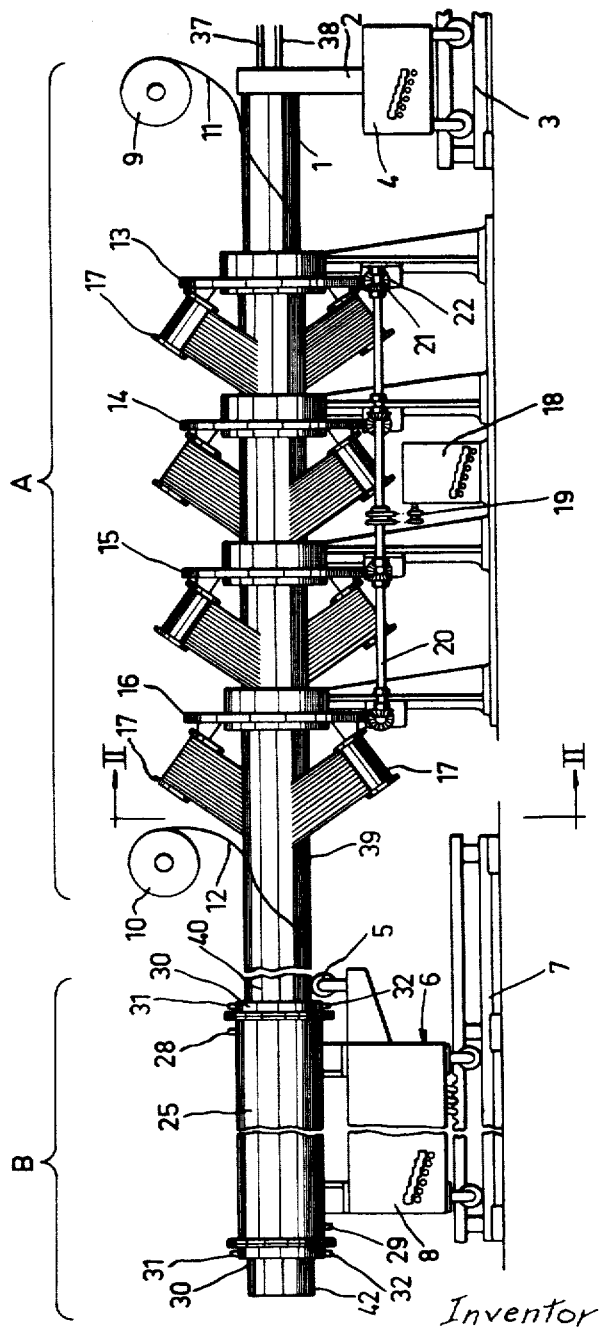

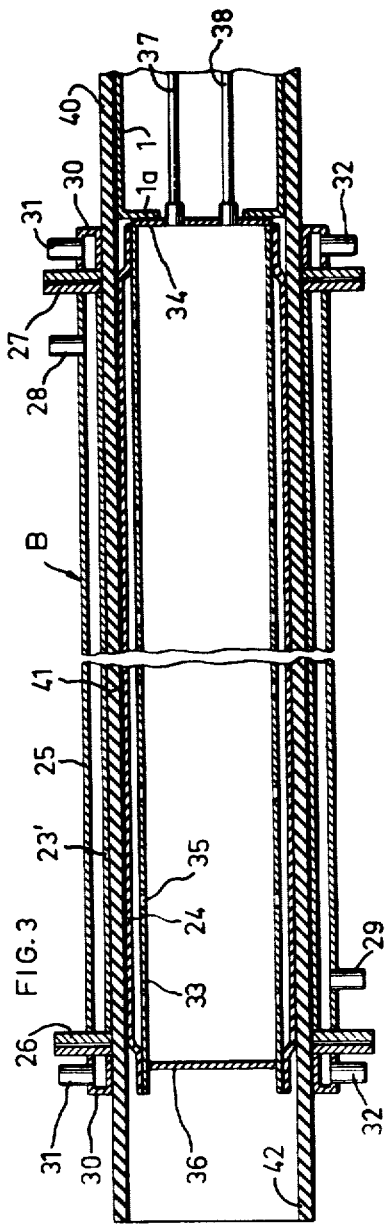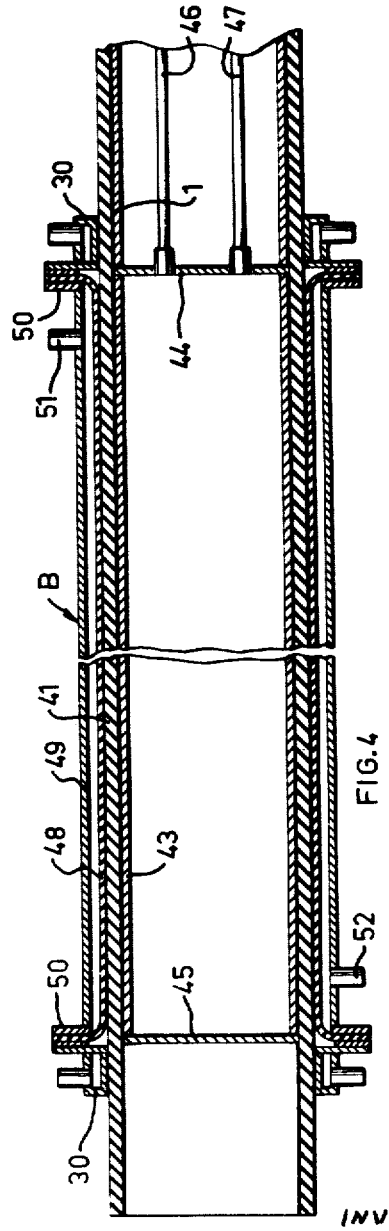

March 26, 1963  E. C. STRANDQUIST  3,083,130
PROCESS OF MANUFACTURING FIBRE-REINFORCED HOSES
OF VULCANIZED ELASTOMER AND APPARATUS THEREFOR
Filed Oct. 19, 1959  4 Sheets-Sheet 4

INVENTOR
ERNST C. STRANDQUIST

By
Wenderoth, Lind & Ponack
Attys.

United States Patent Office 3,083,130
Patented Mar. 26, 1963

3,083,130
PROCESS OF MANUFACTURING FIBRE-REINFORCED HOSES OF VULCANIZED ELASTOMER AND APPARATUS THEREFOR
Ernst Clementz Strandquist, Trelleborg, Sweden, assignor to Trelleborgs Gummifabriks Aktiebolag, Trelleborg, Sweden, a corporation of Sweden
Filed Oct. 19, 1959, Ser. No. 847,146
Claims priority, application Sweden Apr. 8, 1959
5 Claims. (Cl. 156—143)

For certain purposes, say water conduits laid out on the bottom of the sea, fibre-reinforced elastomer hoses are required in so large dimensions that they cannot be manufactured by the ordinary process of making slender elastomer hoses. Therefore large dimension hoses have been made hitherto by a method comprising building elastomer layers and fibre layers to a hose blank on a mandrel and introducing the mandrel with the hose blank thereon into a vulcanizing unit for the vulcanization of the hose blank. For reasons of handling and insufficient capacity of the existing vulcanizing equipment but limited hose lengths could be produced. With an internal hose diameter of 150 mm. and more, hose lengths longer than 12-15 metres could not possibly be manufactured. To obtain greater hose lengths it was necessary to interconnect several such hose lengths, which is a complicated and expensive procedure. As a rule, metal couplings were used for connecting the hose lengths together, and such couplings are expensive, heavy and unhandy and also exposed to risks of corrosion. Moreover, the connecting points always are the weakest links of the hose. Consequently, there is a great demand for considerably larger lengths of continuous hoses without joints, and the only restrictions imposed on the hose length are the possibility of handling the hoses for transports and in laying them.

The present invention aims at entirely satisfying this demand. The invention therefore relates to a process of manufacturing fibre-reinforced hoses of vulcanized elastomer comprising building elastomer layers and fibre layers to a hose blank on a mandrel and then vulcanizing said hose blank. The process according to the invention is characterized by causing the hose blank built on the mandrel and an annular vulcanizing chamber axial to the mandrel to carry out an axial relative movement for the introduction of a length of said hose blank into the vulcanizing chamber and vulcanizing the length of hose blank introduced into said chamber while a further length of hose blank is built up on the mandrel in continuous connection with the length of hose blank being vulcanized in the vulcanizing chamber.

The invention also relates to an apparatus for carrying out the aforesaid process, which is characterized by a mandrel, a hose-building unit located along an axial portion of the mandrel and by means of which elastomer layers and fibre layers are placed on the mandrel to form a hose blank, and a vulcanizing unit disposed axially of the mandrel laterally of the hose-building unit and having an annular vulcanizing chamber coaxial with said mandrel, said vulcanizing chamber being defined by an inner wall and an outer wall, at least one of said walls being movable toward the other for compression of a hose blank introduced into said chamber between said walls, and at least one of said walls being heatable by means of a heating apparatus for the vulcanization of the hose blank clamped between said walls.

Figure 2:
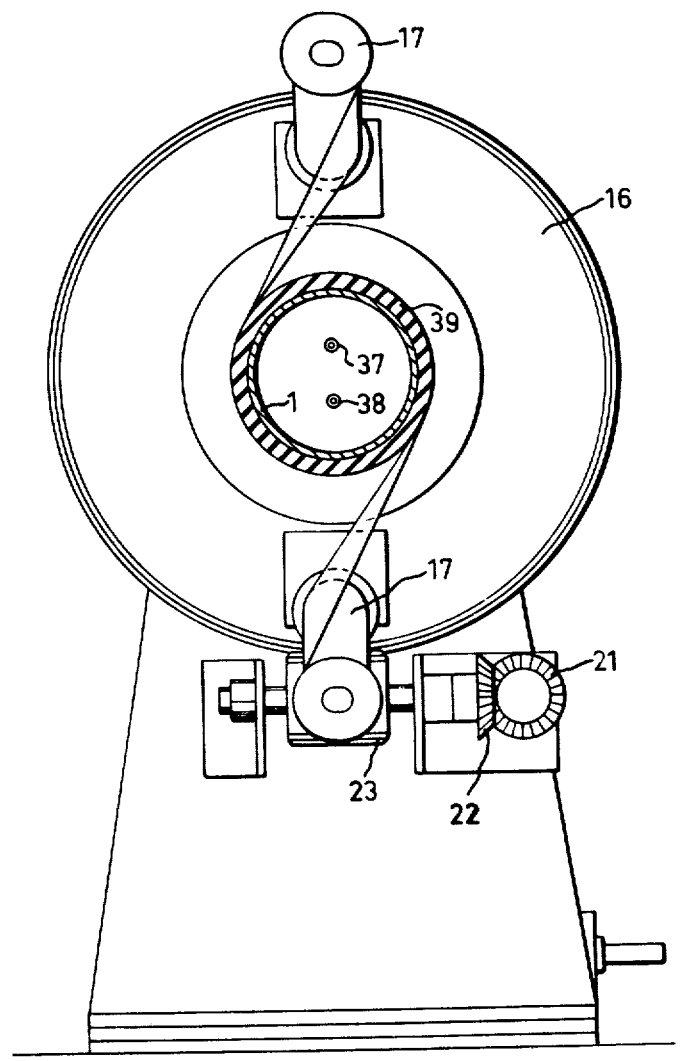
Figure 5:
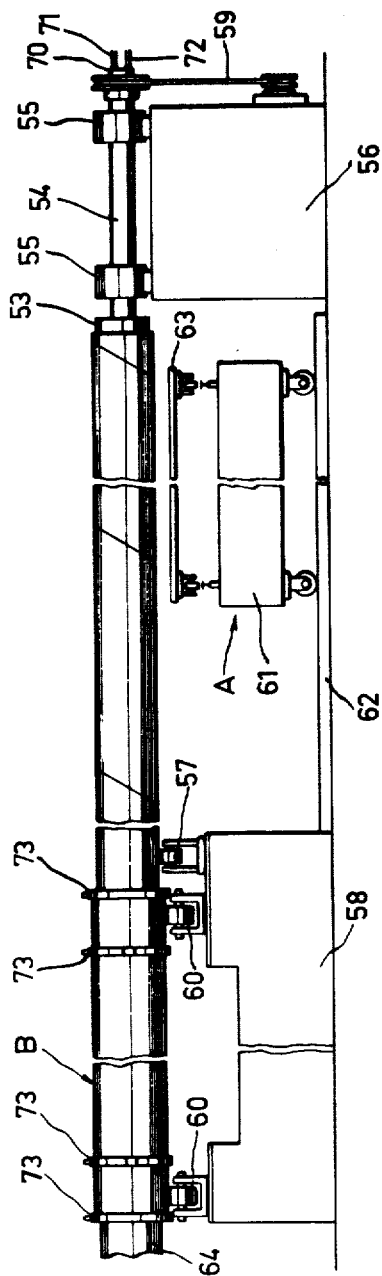
Figure 6:
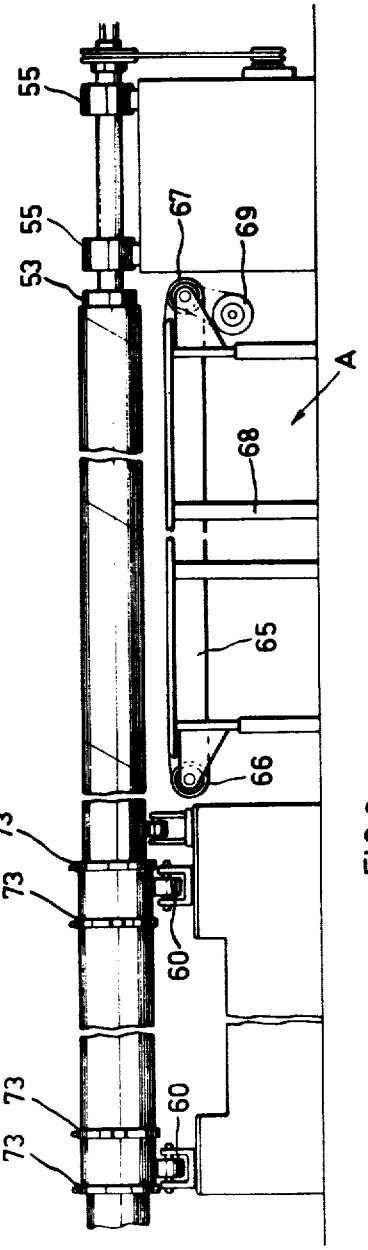

Further features of the invention and the advantages gained thereby will appear from the following description, reference being had to the accompanying drawings, which illustrate some embodiments of the invention. In the drawings:

FIG. 1 is a diagrammatic side elevation of an apparatus according to the invention;

FIG. 2 is a cross-section on line II—II in FIG. 1;
FIGS. 3 and 4 are axial sections of two different embodiments of a vulcanizing unit incorporated with the apparatus shown in FIG. 1;
FIGS. 5 and 6 are side elevations of two further embodiments of the apparatus according to the invention.

In the apparatus illustrated in FIGS. 1-4 there is provided a horizontal mandrel 1, whose outer diameter corresponds to the inner diameter of a hose to be built on the mandrel with the aid of a hose-building unit generally designated A and to be vulcanized in a vulcanizing unit generally designated B and located axially of the mandrel altogether laterally of the hose building unit A. (The mandrel and the hose blank built thereon are broken away in FIG. 1 between the units A and B for space-saving reasons.) One end of the mandrel 1 is carried non-rotatable but axially movable by a carriage 2 which travels on rails 3 and is propelled by a motor and gearcase unit 4 on said carriage. The other end of the mandrel 1 is supported by rollers 5 on a carriage 6 which travels on rails 7 and is propelled by a motor and gearcase unit 8 on said carriage.

The hose building unit A has two supply rolls 9 and 10 for two strips 11 and 12 of rubber or other vulcanizable elastomer. Located between the supply rolls 9 and 10 in the illustrated embodiment are four winding wheels 13-16 known from other fields and each carrying two supply rolls 17 for cords, cord fabric, canvas or other reinforcing fibre material. It is assumed that cord fabric is used in the illustrated embodiment. The mandrel 1 passes centrally through the winding wheels 13-16. These wheels 13-16 are driven by a motor or gearcase unit 18 in the ordinary way over a chain transmission 19, a shaft 20, bevel gears 21 and 22 and a worm 23 (FIG. 2) engaging the respective winding wheel, in such a way that the wheels 13 and 15 rotate in one direction while the wheels 14 and 16 rotate in the other direction.

The vulcanizing unit B mounted on the carriage 6 has an annular vulcanizing chamber which is coaxial with the mandrel 1 and which in the embodiment illustrated in FIG. 3 is defined outwardly by a cylindrical rigid wall 23' and inwardly by a rubber wall 24. The wall 23' is surrounded at a distance by a cylindrical wall 25, and the space between the walls 23' and 25 is closed at the ends of the walls by flanges 26 and 27. Into the jacket thus formed around the annular vulcanizing chamber a suitable heating medium, such as steam or hot water, can be introduced through a pipe 28 and discharged through a pipe 29. Outwardly of each flange 26, 27 is fixed a small annular cooling jacket 30 to which a cooling medium such as cold water can be supplied through a pipe 31, and from which jacket the cooling medium can be discharged through a pipe 32. The rubber wall 24 forming the inner wall of the annular vulcanizing chamber is substantially cylindrical and has its ends secured to a hollow metal cylinder 33 to one end of which an end wall 34 is welded, which may be connected with the end flange 1a of the tubular mandrel 1. The cylinder 33 is of smaller outer diameter than the mandrel 1 and is provided with perforations 35 within the range of the rubber wall 24. At the end remote from the mandrel 1 the cylinder 33 is closed by an end wall 36. A pressure medium, such as hot water, air or steam, can be introduced into the cylinder 33 through a pipe 37 which opens into the wall 34, extends axially through the tubular mandrel 1, and is connected to a suitable source of pressure medium (not shown) beyond the carriage 2 for expanding the rubber wall 24 toward the outer boundary wall 23' of the vulcanizing chamber. The medium in the cylinder 33 can be sucked out through a pipe 38 which opens into the wall 34 and extends axially through the mandrel 1 to a suction device (not shown) beyond the carriage 2 for sucking the rubber wall 24 to the cylinder 33.

In FIGS. 1–3 the apparatus is supposed to have been in operation for some time so that a hose blank 39 is being built on the mandrel 1 within the range of the hose building unit A and another hose blank portion 40, the building of which has been completed, extends from the hose building unit A towards the vulcanizing unit B over a distance which corresponds at least to the length of the vulcanizing unit (most of this hose blank portion 40 is broken away in FIG. 1) while a hose blank portion 41 has just been vulcanized in the vulcanizing chamber of the vulcanizing unit B, and a vulcanized, finished hose portion 42 projects from the end of the vulcanizing unit remote from the hose building unit A. The carriages 2 and 6 are at the left end (as seen in FIG. 1) of their rails 3, 7. When the vulcanization of the hose blank portion 41 has been completed, the rubber wall 24 is sucked against the cylinder 33 and the carriages 2, 6 are returned together with the mandrel 1 to the right end (as seen in FIG. 1) of the rails 3, 7, the mandrel sliding relative to the hose blank which remains, or is retained by means (not shown), in stationary position with respect to the hose building unit A during the return movement of the carriages and the mandrel. The carriages are returned a distance which substantially exactly corresponds to the length of the vulcanizing chamber between the flanges 26 and 27. Consequently, the non-vulcanized hose blank portion 40, the building of which has been completed, will be introduced into the vulcanizing chamber, and the next step consists in supplying pressure medium through the pipe 37 to the cylinder 33 for pressing the rubber wall 24 against the non-vulcanized hose blank portion so that this portion is clamped between the outer and inner boundary walls 23', 24 of the vulcanizing chamber for the vulcanization of this hose blank portion. The vulcanization is produced by transport of heat from the heating medium circulated through the pipes 28, 29 through the wall 23' to the hose blank portion clamped between the walls 23', 24. By means of the cooling rings 30 the action of the vulcanization heat is restricted to the hose blank portion between the flanges 26, 27. During the vulcanization of the carriages 2, 6 are slowly moved along the rails 3, 7 to the left as seen in FIG. 1 by the intermediary of the motor and gear case units 4, 8. The mandrel 1 partakes in this movement and is thus moved to the left as seen in FIG. 1 relative to the hose building unit A. The hose components placed on the mandrel also partakes in said movement. During the described movement the rubber strip 11 is unwound from the supply roll 9 and wrapped by hand or by members (not shown) around the mandrel 1 for forming an inner rubber layer of the hose. Simultaneously, the winding wheels 13–16 are rotated in the manner described before, thus winding cord spirally around the inner rubber layer in such a way that the consecutive cord layers will have opposite spiral pitches. At the same time the rubber strip 12 is unwound from the supply roll 10 and wrapped by hand or by mechanical means (not shown) around the cord layers for forming an outer rubber layer of the hose. In this way a new hose blank portion 40 is built up between the hose building unit A and the vulcanizing unit B while said unit B travels to the left as seen in FIG. 1 for the vulcanization of a previously built hose blank portion. The aforesaid procedure is then repeated again.

It is understood that the above apparatus permits manufacturing a fibre-reinforced hose of vulcanized rubber or other elastomer in any desired length without joints.

It should be observed that the embodiment according to FIGS. 1–3 can be modified so that the mandrel 1 with the frame (carriage) 2 and the unit B are made stationary while the unit A is movable along the mandrel 1.

Though the embodiment, shown in FIG. 3, of the vulcanizing unit will be the most advantageous one, the unit can also be embodied in another manner, say in accordance with FIG. 4. The vulcanizing unit shown in FIG. 4 has an annular vulcanizing chamber which is defined inwardly by a rigid metal cylinder 43 of the same outer diameter as the mandrel 1 and secured thereto by welding with the interposition of a transverse partition 44 separating the cylinder 43 from the mandrel 1. The cylinder end remote from the mandrel 1 is closed by an end wall 45. A heating medium such as hot water or steam can be circulated through the interior of the cylinder 43 by means of two pipes 46 and 47 which open into the partition 44 and extend axially through the mandrel 1. The outer boundary wall of the vulcanizing chamber is formed in FIG. 4 by a rubber sleeve 48 which is surrounded by an outer metal cylinder 49 and the ends of which are clamped between end flanges 50 on the metal cylinder 49 and cooling rings 30 of the kind earlier described. A pressure medium can be supplied to the space between the rubber sleeve 48 and the cylinder 49 through a pipe 51 for pressing a hose blank portion 41 introduced into the vulcanizing chamber against the inner metal cylinder 43 during vulcanization, while the medium between the rubber sleeve 48 and the cylinder 49 can be withdrawn through a pipe 52 so as to expand the rubber sleeve 48 when a relative displacement should be effected between the vulcanizing unit and the hose blank on the mandrel 1.

FIG. 5 shows another embodiment of the apparatus according to the invention. Also in this case there is provided a horizontal mandrel 53 which is not, however, axially movable but mounted for rotation. The mandrel 53 thus has at its right end in FIG. 5 an end wall to which is secured a tubular shaft 54 which is mounted on two bearings 55 in a frame 56. In addition, the mandrel is rotatively supported by a pair of rollers 57 which are mounted in a frame 58. The frame 56 also contains a motor which by means of a V-belt 59 drives the shaft 54 and consequently the mandrel 53. Rotatively mounted on the frame 58 by means of rollers 60 is a vulcanizing unit B so that it can partake in the rotary movement of the mandrel. The vulcanizing unit is of the construction shown in FIGS. 3 or 4 except that the fixed pipe connections 28, 29, 31, 32, 51, 52 have been replaced by in and per se known slide rings 73 or hoses or the like so that fluids can be supplied to the vulcanizing unit B from stationary pipe lines in spite of the fact that the unit B rotates. The connection pipes 37, 38 (FIG. 3) or 46, 47 (FIG. 4) of the vulcanizing unit which are not shown in FIG. 5 extend through the tubular mandrel 53 and the tubular shaft 54 and are connected, over a known pipe coupling 70 permitting relative rotation and mounted in the end of the tubular shaft 54, to pipes 71 and 72 which lead to necessary devices (not shown) for supplying and discharging, respectively, the required fluids.

The hose building unit A in FIG. 5 comprises a carriage 61 which is drivable axially of the mandrel 53 on rails 62 beneath said mandrel. The carriage 61 is of considerable width in a direction perpendicular to the plane of the drawing (FIG. 5), and on the carriage a table 63 is mounted for movement in under the mandrel and laterally outwards from under it in a direction perpendicular to the plane of the drawing (FIG. 5).

Rubber layers and cord layers or fabric layers which are taken from supply rolls (not shown) in a supply frame and cut to appropriate sizes are placed on the table 63 while it is laterally of the mandrel 53. The table 63 is then moved in under the mandrel 53, the layers are affixed to the mandrel 53 and the mandrel is set in rotation. During the rotation of the mandrel 53 the layers are wound onto it. By moving the carriage 61 axially of the mandrel it is possible to apply the next width of layer in direct connection to the preceding one. While a hose blank is built up in this manner on the mandrel 53 above the hose building unit A, a previously built hose blank portion is vulcanized in the vulcanizing unit B which rotates together with the mandrel 53 and the hose components thereon. When the vulcanization of the hose blank portion in the vulcanizing unit B is finished and a hose blank portion has been built by the unit A, the hose is moved on the mandrel 53 to the left as seen in FIG. 5 a distance corresponding to the length of the vulcanizing chamber of the unit B by a pull being exerted in the hose portion 64 projecting from the vulcanizing unit B and the vulcanization of which is finished, by hand or by some suitable mechanical device. During the vulcanization of the hose blank portion newly inserted in the unit B, a new hose blank portion is built in the manner described by the hose building unit A.

FIG. 6 shows a further embodiment of the apparatus according to the invention. The embodiment shown in this figure corresponds in all details with the apparatus shown in FIG. 5 except for the hose building unit A. In FIG. 6 this unit comprises an endless conveyor belt 65 passing over two guide pulleys 66 and 67 which are mounted on a frame 68 and of which the pulley 67 is driven by a motor 69 in said frame. The conveyor belt 65 is of considerable width in a direction perpendicular to the plane of the drawing (FIG. 6) and lies partly beneath the mandrel 53 and partly laterally thereof. Rubber and fabric layers from supply rolls (not shown) in a frame (not shown) are placed on the conveyor belt 65. Said frame is located to the right of the pulley 67 in FIG. 6. The conveyor belt 65 is driven while the layers are placed thereon, but is stationary while the layers are wound onto the rotating mandrel 53, which, during its rotation, draws the layers sliding on the conveyor belt 65 towards itself. The apparatus could of course be designed also in such a way that the frame 68 is movable transversely of the mandrel, whereby the conveyor belt could be made narrower. In this case the conveyor belt is located laterally of the mandrel while the rubber and fabric layers are placed thereon, and is moved in under the mandrel 53 while the layers are wound onto the rotating mandrel.

What I claim and desire to secure by Letters Patent is:

1. A method of manufacturing a fibre-reinforced hose of vulcanized elastomer, comprising supporting a length of unvulcanized hose on a mandrel, vulcanizing said length of hose in a vulcanizing chamber surrounding said mandrel, supporting elastomer layers and fibre layers adjacent a section of said mandrel extending from said vulcanizing chamber, carrying out a relative movement in the axial direction of said mandrel between said supporting means on one hand and said vulcanizing chamber and mandrel on the other hand while vulcanizing said length of unvulcanized hose, simultaneously feeding said elastomer layers and fibre layers onto said section of the mandrel and forming a new length of unvulcanized hose on said mandrel as a continuous extension of said first mentioned length of unvulcanized hose being simultaneously vulcanized, and then advancing said new length of unvulcanized hose in relation to said mandrel and vulcanizing chamber for positioning said new length of unvulcanized hose in said vulcanizing chamber.

2. A method of manufacturing a fibre-reinforced hose of vulcanized elastomer, comprising supporting a length of unvulcanized hose on a mandrel, vulcanizing said length of hose in a vulcanizing chamber surrounding said mandrel, supporting elastomer layers and fibre layers on supporting means adjacent a section of said mandrel extending from said vulcanizing chamber, carrying out a relative movement in the axial direction of said mandrel and a relative rotation around the axis of said mandrel between said supporting means on one hand and said vulcanizing chamber and mandrel on the other hand while vulcanizing said length of unvulcanized hose, simultaneously feeding said elastomer layers and fibre layers from said supporting means onto said section of the mandrel and forming said layers into a new length of unvulcanized hose on said mandrel as a continuous extension of said first mentioned length of unvulcanized hose being simultaneously vulcanized, and then advancing said new length of unvulcanized hose in relation to said mandrel and vulcanizing chamber for positioning said new length of unvulcanized hose in said vulcanizing chamber.

3. A method of manufacturing a fibre-reinforced hose of vulcanized elastomer, comprising supporting a length of unvulcanized hose on a mandrel, vulcanizing said length of hose in a vulcanizing chamber surrounding said mandrel, supporting elastomer layers and fibre layers on supporting means adjacent a section of said mandrel extending from said vulcanizing chamber, moving said vulcanizing chamber and said mandrel in the axial direction of said mandrel away from said supporting means, while said length of hose is vulcanized in said vulcanizing chamber, and simultaneously feeding said elastomer layers and fibre layers onto said moving mandrel and forming said layers into a new length of unvulcanized hose on said moving mandrel as a continuous extension of said first mentioned length of unvulcanized hose being simultaneously vulcanized, and then moving said vulcanizing chamber and mandrel in the axial direction of said mandrel towards said supporting means and simultaneously holding said lengths of hose stationary in relation to said supporting means for positioning said new length of unvulcanized hose in said vulcanizing chamber.

4. An apparatus for manufacturing a fibre-reinforced hose of vulcanizing elastomer, comprising a mandrel, supporting means for elastomer layers and fibre layers mounted along an axial portion of said mandrel, means for applying said layers to said mandrel to form a built up hose, a vulcanizing chamber spaced in the axial direction of said mandrel from said supporting means and surrounding said mandrel, means for inducing relative movement between said supporting means on one hand and said vulcanizing chamber and said mandrel on the other hand in the axial direction of said mandrel and means for vulcanizing said built up hose.

5. An apparatus for manufacturing a fibre reinforced hose of vulcanized elastomer, comprising a mandrel, supporting means for elastomer layers and fibre layers mounted along an axial portion of said mandrel, means for applying said layers to said mandrel to form a built up hose, a vulcanizing chamber spaced in the axial direction of said mandrel from said supporting means and surrounding said mandrel, means for inducing relative movement between said supporting means on one hand and said vulcanizing chamber and said mandrel on the other hand in the axial direction of said mandrel, means for inducing relative rotation between at least part of said supporting means on one hand and said vulcanizing chamber and said mandrel on the other hand around the axis of said mandrel and means for vulcanizing said built up hose.

References Cited in the file of this patent

UNITED STATES PATENTS

| | | |
|---|---|---|
| 906,215 | Gammeter | Dec. 8, 1908 |
| 1,129,084 | Gammeter | Feb. 23, 1915 |
| 2,319,042 | De Wyk | May 11, 1943 |
| 2,320,564 | Brooks | June 1, 1943 |
| 2,599,746 | Cox | June 10, 1952 |
| 2,605,202 | Reynolds | July 29, 1952 |
| 2,756,458 | Krupp et al. | July 31, 1956 |
| 2,766,160 | Bentov | Oct. 9, 1956 |
| 2,874,723 | Kahn | Feb. 24, 1959 |

Disclaimer 3,083,130.—*Ernst Clementz Strandquist*, Trelleborg, Sweden. PROCESS OF MANUFACTURING FIBRE-REINFORCED HOSES OF VULCANIZED ELASTOMER, AND APPARATUS THEREFOR. Patent dated Mar. 26, 1963. Disclaimer filed Nov. 17, 1966, by the assignee, *Trelleborgs Gummifabriks Aktiebolag*.

Hereby enters this disclaimer as to claims 1, 2, 4 and 5 of said patent.

[*Official Gazette December 27, 1966.*]